(12) United States Patent
Kikuchi

(10) Patent No.: US 6,902,228 B2
(45) Date of Patent: Jun. 7, 2005

(54) VEHICULAR FLOOR CONSTRUCTION

(75) Inventor: Manabu Kikuchi, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 10/882,023

(22) Filed: Jun. 29, 2004

(65) Prior Publication Data

US 2005/0040676 A1 Feb. 24, 2005

(30) Foreign Application Priority Data

Aug. 22, 2003 (JP) .............................. 2003-208380

(51) Int. Cl.$^7$ .............................................. B62D 25/20

(52) U.S. Cl. .............. 296/193.07; 296/30; 296/901.01; 296/37.6

(58) Field of Search .......................... 296/181.2, 181.3, 296/184.1, 183.1, 193.07, 29, 30, 35.1, 37.6, 296/901.01

(56) References Cited

U.S. PATENT DOCUMENTS 4,352,520 A * 10/1982 Stiglmaier et al. ........ 296/184.1
6,543,828 B1 * 4/2003 Gass .......................... 296/35.1

FOREIGN PATENT DOCUMENTS

JP 401160784 A * 6/1989 ............ 296 901.01

* cited by examiner

Primary Examiner—Jason Morrow
(74) Attorney, Agent, or Firm—Reed Smith LLP

(57) ABSTRACT

There is provided a vehicular floor construction in which when a floor panel is assembled to a chassis frame, by surely preventing a collar from coming off a boss, the efficiency of work for assembling the floor panel to the chassis frame can be improved. A floor panel formed of a synthetic resin is mounted on a chassis frame, and the floor panel is fixed to the chassis frame by bolts and nuts. Bosses mounted on the chassis frame are formed of a synthetic resin integrally with the floor panel on the lower surface of the floor panel, and each of the bosses is formed with a through hole through which the bolt is inserted. A collar made of a metal is provided on the boss so as to be brought into close contact with the inner peripheral surface of the boss, and the collar is formed with a slit extending in the lengthwise direction of the collar.

14 Claims, 5 Drawing Sheets

VEHICULAR FLOOR CONSTRUCTION

CROSS REFERENCES TO RELATED APPLICATIONS

This application claims Paris Convention priority of Japanese Application No. 2003-208380 filed Aug. 22, 2003, the entire disclosure of which is hereby incorporated by reference.

BACKGROUND OF THE INVENTION

1. Field of the Invention

The present invention relates to a construction of a floor panel for a platform of a truck or a battery tray of an electric vehicle or a hybrid vehicle.

2. Description of the Related Art

Conventionally, there has been known a vehicular rear deck in which at least a floor panel of the rear deck is formed of a synthetic resin; at least a pair of cross ribs extending in the vehicle width direction is provided on the lower surface of the floor panel; a concave portion is formed in the floor panel between these cross ribs; and further a bottom wall of the concave portion is provided between the ribs and is formed with an opening (for example, Unexamined Japanese Utility Model Publication No. 3-102385 (claim, Specification 19th line on page 2 through 14th line on page 2, FIGS. 2 and 3). For the rear deck of this vehicle, the concave portion is closed by a plug.

In the vehicular rear deck constructed as described above, a bolt is inserted through the opening formed in the bottom wall of the concave portion, and this bolt is further inserted through an elastic material and a chassis frame so that a nut is threadedly engaged with the bolt, by which the floor panel is assembled to the chassis frame. Therefore, the strength of a body mount portion at which stress concentrates can be secured, and also the number of parts can be decreased to reduce the manufacturing cost.

However, in the conventional vehicular rear deck described in the aforementioned Publication, the elastic material is interposed between the bottom wall of concave portion and the chassis frame. Therefore, when the bolt is inserted through these elements, there is a fear of inadvertently dropping the elastic material, which presents a problem of decreased the efficiency of work for assembling the floor panel to the chassis frame.

Also, in the conventional vehicular rear deck described in the aforementioned Publication, the opening through which the bolt is inserted is formed in the bottom wall of concave portion that is made of a synthetic resin. Therefore, if the thickness of bottom wall is small, there is a fear that a crack is formed in the bottom wall by stress concentration at the periphery of the opening, and if the thickness of bottom wall is large, there is a fear that a sink mark (depression formed in the surface at the time of molding) is produced in the bottom wall.

SUMMARY OF THE INVENTION

A first object of the present invention is to provide a vehicular floor construction in which when a floor panel is assembled to a chassis frame, by surely preventing a collar from coming off a boss, the efficiency of work for assembling the floor panel to the chassis frame can be improved.

A second object of the present invention is to provide a vehicular floor construction in which the occurrence of a sink mark in a boss can be prevented, and by inhibiting stress concentration at the boss, the boss can be prevented from being damaged.

A third object of the present invention is to provide a vehicular floor construction in which a floor panel made of a synthetic resin is effectively reinforced by a longitudinal bead, transverse rib, and oblique rib, and a boss can also be reinforced effectively without an increase in the number of parts.

The invention of a first aspect provides an improvement in a vehicular floor construction in which a floor panel 13 formed of a synthetic resin is mounted on a chassis frame 18, and the floor panel 13 is fixed to the chassis frame 18 by a bolt 19 and a nut 21, as shown in FIGS. 1 and 2.

The characteristic configuration of the invention of the first aspect is such that a boss 22 mounted on a chassis frame 18 is formed of a synthetic resin integrally with the floor panel 13 on the lower surface of the floor panel 13; the boss 22 is formed with a through hole 22a through which the bolt 19 is inserted; a collar 23 made of a metal is provided so as to be brought into close contact with the inner or outer peripheral surface of the boss 22; and the collar 23 is formed with a slit 23a extending in the lengthwise direction of the collar 23.

In the vehicular floor construction described in the invention of the first aspect, if the collar 23 is inserted in the through hole 22a of the boss 22 in the state in which the collar 23 is elastically deformed in the direction such that the diameter thereof is decreased, the collar 23 is deformed in the direction such that the diameter thereof is increased, and is kept in the state of being brought into close contact with the inner peripheral surface of the through hole 22a of the boss 22. As a result, even if vibrations or a shock is applied to the floor panel 13 when the floor panel 13 is mounted on the chassis frame 18, the collar 23 will not come off the boss 22, so that the floor panel 13 can be assembled to the chassis frame 18 quickly.

The invention of a second aspect is characterized in that in the invention of the first aspect, the slit 23a is formed so as to extend in the lengthwise direction of the collar 23 and to be bent in a crank shape.

In the vehicular floor construction described in the invention of the second aspect, when the collar 23 is elastically deformed to be inserted into the through hole 22a or after the collar 23 has been inserted into the through hole 22a, both side edges of the slit 23a engage with each other, so that one edge of the slit 23a can be prevented from shifting in the lengthwise direction of the slit 23a with respect to the other edge.

The slit may be formed so as to extend in parallel with the lengthwise direction of the collar, or may be formed so as to extend in the lengthwise direction of the collar in a state of being inclined at a predetermined angle with respect to the lengthwise direction of the collar. Also, the floor panel may be a floor panel for a platform of a truck, or may be a floor panel for a battery tray of an electric vehicle or a hybrid vehicle. Further, the collar may be provided so as to be in close contact with the inner peripheral surface of the boss.

The invention of an eighth aspect provides an improvement in a vehicular floor construction in which a floor panel 13 formed of a synthetic resin is mounted on a chassis frame 18; the floor panel 13 is fixed to the chassis frame 18 by a bolt 19 and a nut 21; and a longitudinal bead 24 extending in the travel direction of a vehicle 10 and a transverse rib 26 extending in the vehicle width direction are formed on the floor panel 13.

The characteristic configuration of the invention of the eighth aspect is such that a plurality of bosses 22 mounted on the chassis frame 18 are formed of a synthetic resin integrally with the floor panel 13 on the lower surface of the floor panel 13; and an oblique rib 27 is formed on the lower surface of the floor panel 13 so as to be inclined with respect to the longitudinal bead 24 and the transverse rib 26 and to connect any two of the bosses 22.

In the vehicular floor construction described in the invention of the eighth aspect, since not only the longitudinal bead 24 and the transverse rib 26 but also the oblique rib 27 is formed on the floor panel 13, the floor panel 13 made of a synthetic resin can be reinforced effectively. Also, since the bosses 22 are connected by the oblique rib 27, the boss 22 is also reinforced effectively.

The invention of a ninth aspect is characterized in that in the invention of the eighth aspect, the floor panel 13 is formed so as to be brought into contact with the chassis frame 18 by only the bosses 22.

In the vehicular floor construction described in the invention of the ninth aspect, if the floor panel 13 is mounted on the side member in a point manner by using only the bosses 22 (mount portions) without mounting the transverse ribs 26 and the oblique ribs 27 on the side member, even if the side member is deformed locally, the deformation caused on the floor panel 13 by this local deformation of side member develops from the necessary minimum bosses 22 (mount portions). Therefore, no local and compulsory deformation occurs on the floor panel 13.

DETAILED DESCRIPTION OF THE PREFERRED EMBODIMENTS

A first embodiment of the present invention will now be described with reference to the accompanying drawings.

Figure 5:
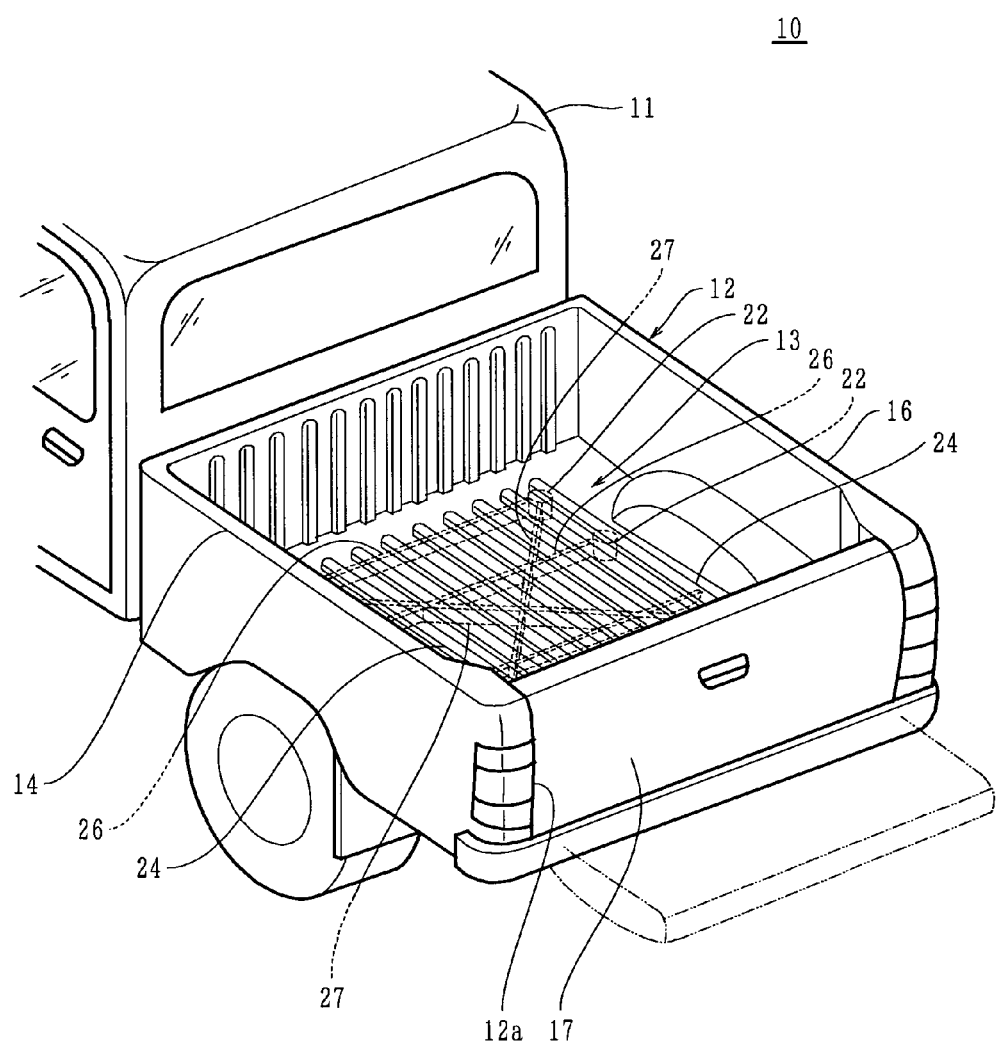
FIG. 5 is a perspective view of an essential portion including a truck platform.
Figure 6:
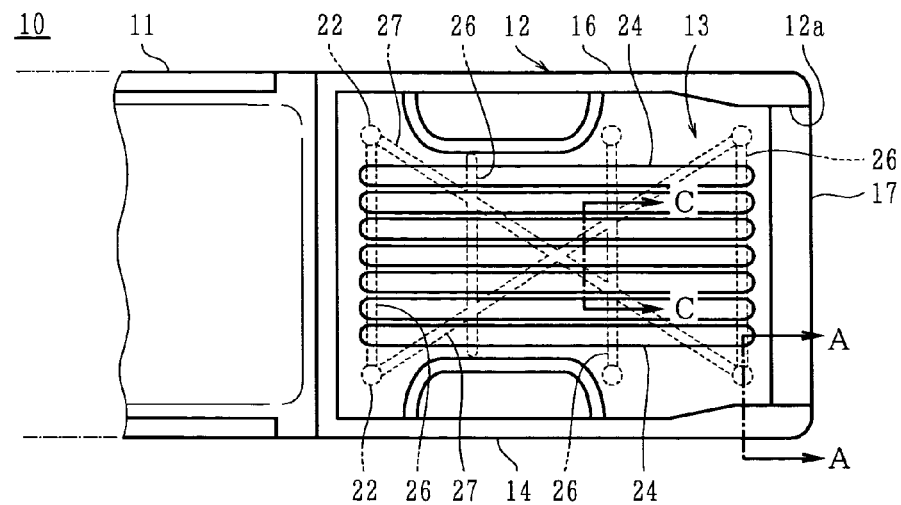
FIG. 6 is a plan view of an essential portion including a truck platform.

As shown in FIGS. 5 and 6, a platform 12 is provided on the back surface of a cab 11 of a truck 10. At both side edges of a floor panel 13 of the platform 12, a pair of side panels 14 and 16 are erected, and an opening 12a at the rear end of the platform 12 is openably closed by a tail gate 17. The floor panel 13 is mounted on a side member 18a of a chassis frame 18, and the floor panel 13 is fixed to the side member 18a with bolts 19 and nuts 21 (FIGS. 1 and 3).

The floor panel 13 is formed of a synthetic resin such as FRP (fiber-reinforced plastic), and the side member 18a is formed of a metal such as steel or aluminum alloy. On the lower surface of the floor panel 13, a plurality of bosses 22 are formed of a synthetic resin integrally with the floor panel with predetermined intervals being provided. These bosses 22 are mounted on the upper surface of the side member 18a, that is, the lower surface of the boss 22 is brought into contact with the upper surface of the side member 18a. The boss 22 is formed with a through hole 22a extending in the vertical direction, and the upper surface of the side member 18a is formed with a through hole 18b that is opposed to the through hole 22a.

Figure 1:
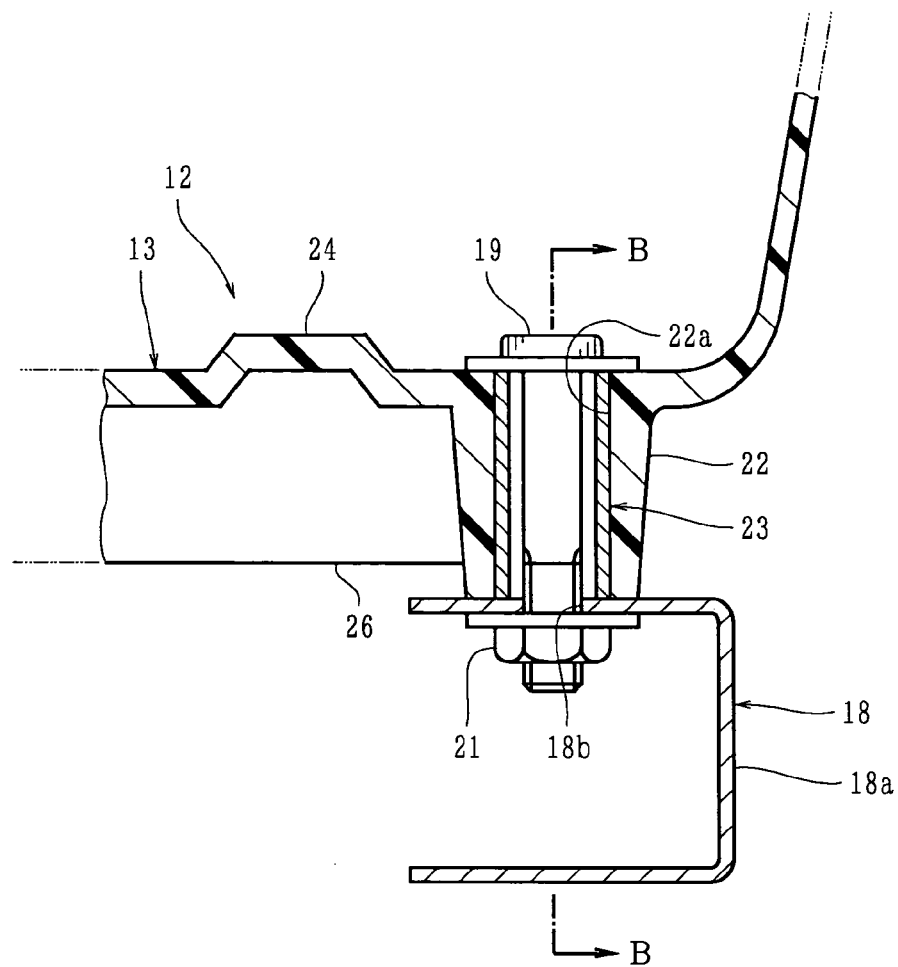
FIG. 1 is a sectional view taken along the line A—A of FIG. 6, showing a floor construction of a truck platform in accordance with a first embodiment of the present invention.
Figure 2:
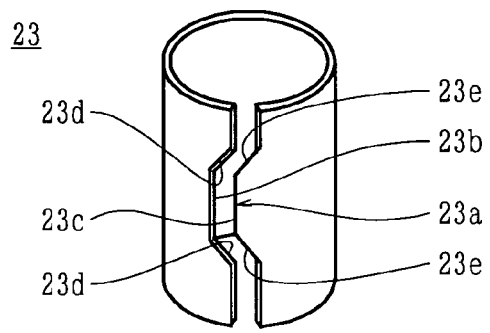
FIG. 2 is a perspective view of a collar.
Figure 3:
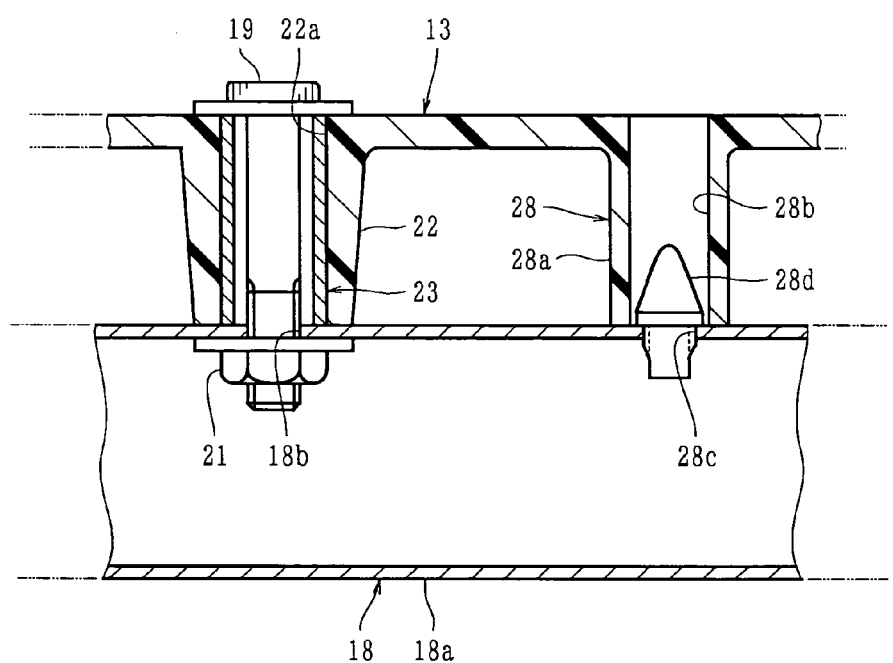
FIG. 3 is a sectional view taken along the line B—B of FIG. 1.

Further, in the through hole 22a in the boss 22, a collar 23 formed of a metal such as steel or aluminum alloy is provided so as to be in close contact with the inner peripheral surface of the through hole 22a (FIGS. 1 to 3). The collar 23 is formed with a slit 23a that extends in the lengthwise direction of the collar 23 and is bent into a crank shape (FIG. 2). The collar 23 can be deformed elastically in the direction such that the width of the slit 23a is narrowed. The collar 23 is formed so that in a state of being left alone, the diameter of the collar 23 is slightly larger than the hole diameter of the through hole 22a, and when the collar 23 is elastically deformed in the direction such that the diameter thereof is decreased, the outside diameter of the collar 23 is smaller than the hole diameter of the through hole 22a.

The slit 23a bent into a crank shape has a concave portion 23b formed in the center of one edge of the slit 23a and a convex portion 23c formed in the center of the other edge of the slit 23a so as to be opposed to the concave portion 23b. On both sides of the concave portion 23b, first inclined portions 23d, 23d are formed, and on both sides of the convex portion 23c, second inclined portions 23e, 23e, which are formed so as to be opposed to and in parallel with the first inclined portions 23d, 23d, are formed. The collar 23 is formed so that when the collar 23 is inserted in the through hole 22a, the width of the slit 23a is not larger than 1 mm, preferably in the range of 0.5 to 1 mm, and further preferably 0.5 mm.

Figure 4:
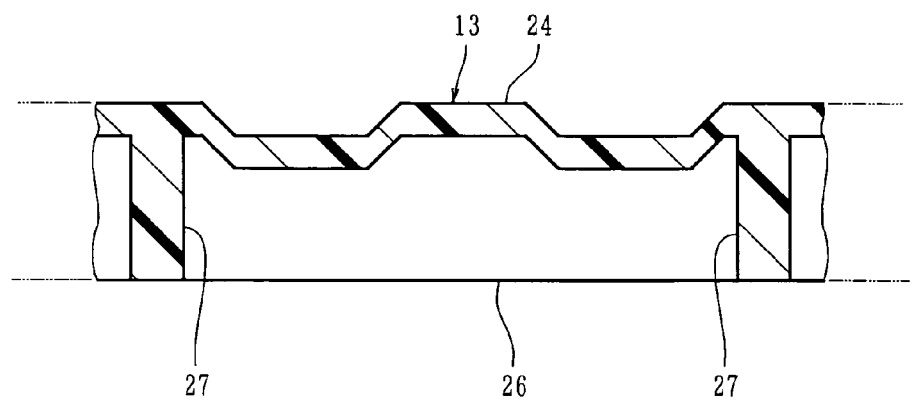
FIG. 4 is a sectional view taken along the line C—C of FIG. 6.

On the other hand, the floor panel 13 is formed with a plurality of longitudinal beads 24, which extend in the travel direction of the truck 10, at predetermined intervals, and the lower surface of the floor panel 13 is formed with a plurality of transverse ribs 26, which extend in the vehicle width direction, at predetermined intervals (FIGS. 1 and 4 to 6). Both ends of a predetermined transverse rib 26 of the transverse ribs 26 are formed so as to connect with the boss 22. Also, the lower surface of the floor panel 13 is formed with two oblique ribs 27, which are inclined with respect to the longitudinal beads 24 and the transverse ribs 26, in an shape (FIGS. 4 to 6). The oblique ribs 27 are formed so that both ends thereof connect with any two of the bosses 22. The longitudinal beads 24, the transverse ribs 26, and the oblique ribs 27 are formed of a synthetic resin integrally with the floor panel 13.

Between the floor panel 13 and the side member 18a, a positioning mechanism 28 is provided to position the floor panel 13 with respect to the side member 18a (FIG. 3). The positioning mechanism 28 has a positioning cylinder 28a which is provided on the lower surface of the floor panel 13 so as project downward and is formed with a positioning hole 28b, an engagement hole 28c which is formed in the upper surface of the side member 18a so as to be opposed to the positioning hole 28b, and a positioning pin 28d the lower end of which is engaged with the engagement hole 28c and the upper end of which is inserted in the positioning hole 28b. The positioning cylinder 28a is formed of a synthetic resin integrally with the floor panel 13, and the positioning pin 28d is formed of a synthetic resin such as PP (polypropylene).

A procedure for assembling the floor panel 13 constructed as described above to the side member 18a will be explained.

First, a collar 23 is inserted into the through hole 22a in the boss 22 in a state in which the collar 23 is elastically deformed in the direction such that the diameter of the collar 23 is decreased. At this time, if the slit 23a is formed so as to have a relatively large width, even when the diameter of the collar 23 and the inside diameter of the through hole 22a vary, the collar 23 can be inserted into the through hole 22a smoothly without impairing the inner peripheral surface of the through hole 22a. Also, since the slit 23a is formed into a crank shape, when the collar 23 is elastically deformed to be inserted into the through hole 22a, or after the collar 23 has been inserted in the through hole 22a, the concave portion 23b and the convex portion 23c of the slit 23a fit to each other. In other words, the first inclined portions 23d, 23d and the second inclined portions 23e, 23e are engaged with each other, by which one edge of the slit 23a is prevented from shifting with respect to the other edge thereof in the lengthwise direction of the slit 23a. Also, since the collar 23 is formed so that the width of the slit 23a after the collar 23 has been inserted in the through hole 22a is not larger than 1 mm, even if a torsional load etc. are applied to the boss 22 (mount portion), the concave portion 23b and the convex portion 23c of the slit 23a fit to each other, that is, the first inclined portions 23d, 23d and the second inclined portions 23e, 23e are engaged with each other. Thereby, the strength corresponding to a slit-less collar can be secured, and also the insertion work efficiency equivalent to that of slit-less collar can be secured.

Next, after the positioning pin 28d is engaged with the engagement hole 28c in the side member 18a, the floor panel 13 is mounted on the side member 18a, and the positioning hole 28b in the floor panel 13 is fitted on the positioning pin 28d. Thereby, the through hole 22a in the boss 22 of the floor panel 13 is aligned with the through hole 18b in the side member 18a. In this state, the bolt 19 is inserted through the through hole 22a and the through hole 18b.

Here, the collar 23 is elastically deformed in the direction such that the diameter thereof is increased, and is kept in a state of being brought into close contact with the inner peripheral surface of the through hole 22a in the boss 22. Therefore, when the floor panel 13 is mounted on the side member 18a, the collar 23 will not come off the boss 22 even if vibrations or a shock is applied to the floor panel 13. In this state, the nut 21 is threadedly engaged with the bolt 19 projecting from the through hole 18b. As a result, the floor panel 13 can be assembled to the side member 18a quickly. Although a force acts in the direction such that the boss 22 is compressed when the nut 21 is threadedly engaged with the nut 21 and is tightened, the collar 23 receives this compressive force. Consequently, the compressive force on the boss 22 is decreased, so that the boss 22 is prevented from being damaged.

As described above, in the floor panel 13 assembled to the side member 18a, the floor panel 13 is formed with the longitudinal beads 24 and the transverse ribs 26, and also is formed with the oblique ribs 27, so that the floor panel 13 made of a synthetic resin can be reinforced effectively. Also, since the bosses are connected to each other by the oblique rib 27, the boss 22 can also be reinforced effectively. If the floor panel 13 is brought into contact with the side member 18a by only the bosses 22 (mount portions) separated from each other, that is, if the floor panel 13 is mounted on the side member 18a in a point manner by using only the bosses 22 (mount portions) without mounting the transverse ribs 26 and the oblique ribs 27 on the side member 18a, even if the side member 18a is deformed locally, the deformation caused on the floor panel 13 by this local deformation of side member 18a develops from the necessary minimum bosses 22 (mount portions). Therefore, less local and compulsory deformation occurs on the floor panel 13. As a result, the floor panel 13 is deformed naturally as a whole panel, so that this configuration is advantageous in terms of strength.

Figure 7:
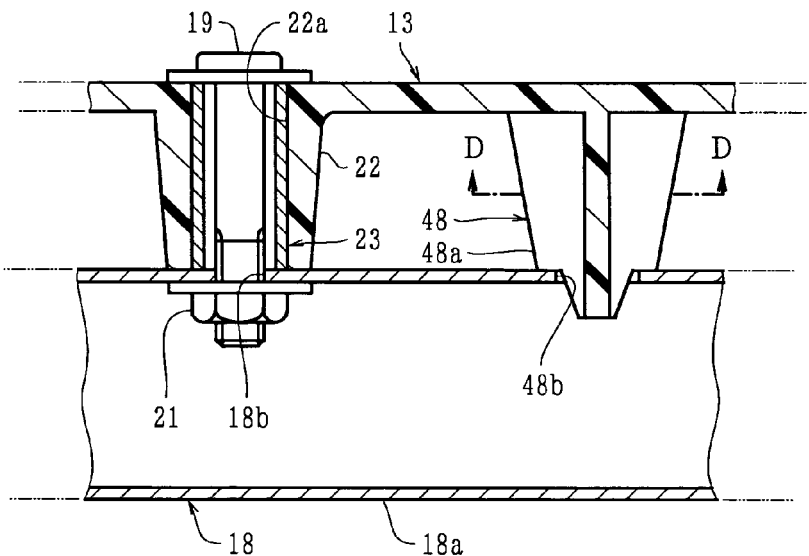
FIG. 7 is a sectional view corresponding to FIG. 3, showing a second embodiment of the present invention.
Figure 8:
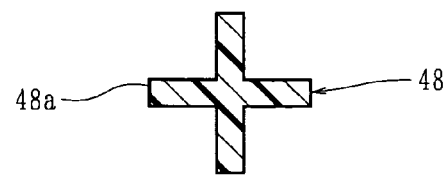
FIG. 8 is a sectional view taken along the line D—D of FIG. 1.

FIGS. 7 and 8 show a second embodiment of the present invention. In FIG. 7, the same reference numerals are applied to the same elements as those shown in FIG. 3.

In this embodiment, a positioning mechanism 48 for positioning the floor panel 13 with respect to the side member 18a has a positioning protrusion 48a which is formed of a synthetic resin integrally with the floor panel 13 on the lower surface of the floor panel 13 and a positioning hole 48b formed in the upper surface of the side member 18a so as to be opposed to the positioning protrusion 48a. The positioning protrusion 48a is formed so as to have a substantially crosswise shape in transverse cross section and to be tapered gradually toward the downside. Other constructions are the same as those of the first embodiment.

In the floor construction for a truck platform configured as described above, the positioning pin in the first embodiment is not needed, so that the number of parts can be decreased, and also the assembling manpower can be reduced. The assembling procedure and operation other than the above-described ones are almost the same as those of the first embodiment, so that repeated explanation is omitted.

Although explanation has been given of the floor panel for a truck platform in the above embodiments, the present invention can be applied to a floor panel for a battery tray made of a synthetic resin, which is used for an electric vehicle or a hybrid vehicle, and also the floor panel may be formed into a box shape.

Figure 9:
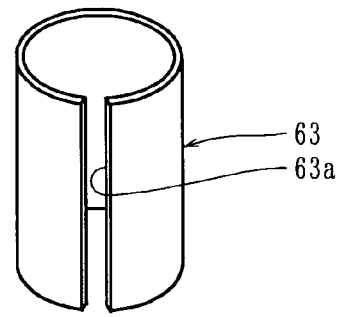
FIG. 9 is a perspective view of a collar showing a third embodiment of the present invention.
Figure 10:
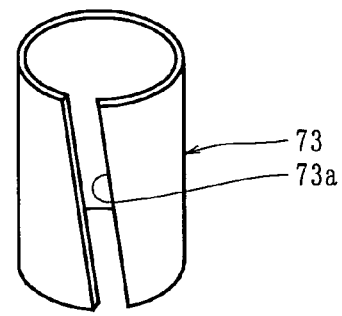
FIG. 10 is a perspective view of a collar showing a fourth embodiment of the present invention.

Also, in the above-described embodiments, the slit in the collar is formed so as to extend in the lengthwise direction of the collar by being bent into a crank shape. However, as shown in FIG. 9, a slit 63a in a collar 63 may be formed into a shape extending in parallel in the lengthwise direction of the collar 63 so as to be fabricated easily. Alternatively, as shown in FIG. 10, a slit 73a in a collar 73 may be formed so as to extend in a state of being inclined at a predetermined angle with respect to the lengthwise direction of the collar 73.

Figure 11:
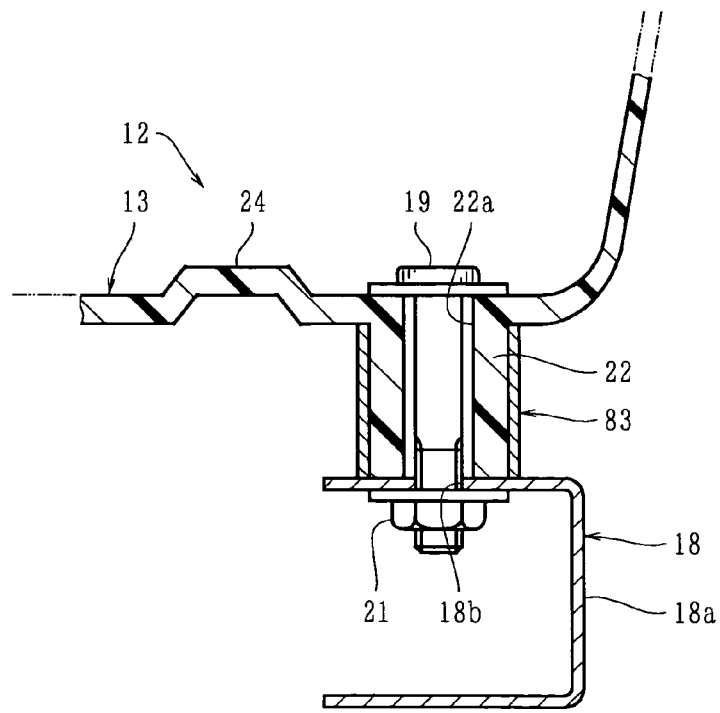
FIG. 11 is a sectional view corresponding to FIG. 1, showing a fifth embodiment of the present invention.

Furthermore, although the collar is fitted on the inner peripheral surface of the boss in the above-described embodiments, as shown in FIG. 11, a collar 83 may be fitted on the outer peripheral surface of the boss 22. In this case, although not shown in the drawing, the collar 83 is formed so that a slit extending in the lengthwise direction of the collar 83 is formed, the inside diameter of the collar 83 is slightly smaller than the outside diameter of the boss 22, and the collar 83 can be deformed elastically in the direction such that the inside diameter thereof is made larger than the outside diameter of the boss 22.

As described above, according to the present invention, bosses that are mounted on the chassis frame are formed of a synthetic resin integrally with the floor panel on the lower surface of the floor panel; the through hole through which the bolt is inserted is formed in each of the bosses; the collar made of a metal is provided so as to be in close contact with the inner or outer peripheral surface of the boss; and the collar is formed with the slit extending in the lengthwise direction of the collar. Therefore, if the collar is fitted on the inner or outer peripheral surface of the boss in the state in which the collar is elastically deformed in the direction such that the diameter thereof is decreased or increased, the collar is deformed in the direction of restoration, and is kept in the state of being brought into close contact with the inner or outer peripheral surface of the boss. As a result, even if vibrations or a shock is applied to the floor panel when the floor panel is mounted on the chassis frame, the collar will not come off the boss, so that the floor panel can be assembled to the chassis frame quickly.

Comparing with the conventional vehicular rear deck in which it is difficult to satisfactorily maintain the rigidity and formability of bottom wall of the concave portion, the vehicular floor construction in accordance with the present invention can be configured so that since the boss can be reinforced by the collar without an increase in boss size, the occurrence of a sink mark in the boss can be prevented, and also by inhibiting stress concentration at the boss, the boss can be prevented from being damaged.

Also, if the slit is formed so as to extent in the lengthwise direction of the collar and to be bent in a crank shape, when the collar is elastically deformed to be inserted into the through hole or after the collar has been inserted into the through hole, both side edges of the slit engage with each other. As a result, one edge of the slit can be prevented from shifting in the lengthwise direction of the slit with respect to the other edge.

Also, a plurality of bosses mounted on the chassis frame are formed of a synthetic resin integrally with the floor panel on the lower surface of the floor panel, and oblique ribs are formed on the lower surface of the floor panel so as to be inclined with respect to the longitudinal beads and the transverse ribs and to connect any two of the bosses. Thereby, the floor panel made of a synthetic resin is effectively reinforced by the longitudinal beads, the transverse ribs, and the oblique ribs, and the bosses connected by the oblique rib can also be reinforced effectively.

Further, if the floor panel is formed so as to be brought into contact with the chassis frame by only the bosses, the floor panel is mounted on the side member in a point manner by using only the bosses (mount portions) without mounting the transverse ribs and the oblique ribs on the side member. As a result, even if the side member is deformed locally, the deformation caused on the floor panel by this local deformation of side member develops from the necessary minimum bosses (mount portions), so that no local and compulsory deformation occurs on the floor panel. Therefore, the floor panel is deformed naturally as a whole panel, so that this configuration is advantageous in terms of strength.

What is claimed is:

1. A vehicular floor construction in which a floor panel formed of a synthetic resin is mounted on a chassis frame, and said floor panel is fixed to said chassis frame by a bolt and a nut, wherein
  a boss mounted on said chassis frame is formed of a synthetic resin integrally with said floor panel on the lower surface of said floor panel;
  said boss is formed with a through hole through which said bolt is inserted;
  a collar made of a metal is provided so as to be brought into close contact with the inner peripheral surface of said boss; and
  said collar is formed with a slit extending in the lengthwise direction of said collar.

2. The vehicular floor construction according to claim 1, wherein said slit is formed so as to extend in the lengthwise direction of said collar and to be bent in a crank shape.

3. The vehicular floor construction according to claim 1, wherein said slit is formed so as to extend in parallel with the lengthwise direction of said collar.

4. The vehicular floor construction according to claim 1, wherein said slit is formed so as to extend in the lengthwise direction of said collar in a state of being inclined at a predetermined angle with respect to the lengthwise direction of said collar.

5. The vehicular floor construction according to claim 1, wherein said floor panel is a floor panel for a platform of a truck.

6. The vehicular floor construction according to claim 1, wherein said floor panel is a floor panel for a battery tray of an electric vehicle or a hybrid vehicle.

7. A vehicular floor construction in which a floor panel formed of a synthetic resin is mounted on a chassis frame; said floor panel is fixed to said chassis frame by a bolt and a nut; and a longitudinal bead extending in the travel direction of a vehicle and a transverse rib extending in the vehicle width direction are formed on said floor panel, wherein
  a plurality of bosses mounted on said chassis frame are formed of a synthetic resin integrally with said floor panel on the lower surface of said floor panel; and
  an oblique rib is formed on the lower surface of said floor panel so as to be inclined with respect to said longitudinal bead and said transverse rib and to connect any two of said bosses.

8. The vehicular floor construction according to claim 7, wherein said floor panel is formed so as to be brought into contact with said chassis frame by only said bosses.

9. A vehicular floor construction in which a floor panel formed of a synthetic resin is mounted on a chassis frame, and said floor panel is fixed to said chassis frame by a bolt and a nut, wherein
  a boss mounted on said chassis frame is formed of a synthetic resin integrally with said floor panel on the lower surface of said floor panel;
  said boss is formed with a through hole which said bolt is inserted;
  a collar made of a metal is provided so as to be brought into close contact with the outer peripheral surface of said boss; and
  said collar is formed with a slit extending in the lengthwise direction of said collar.

10. The vehicular floor construction according to claim 9, wherein said slit is formed so as to extend in the lengthwise direction of said collar and to be bent in a crank shape.

11. The vehicular floor construction according to claim 9, wherein said slit is formed so as to extend in parallel with the lengthwise direction of said collar.

12. The vehicular floor construction according to claim 9, wherein said slit is formed so as to extend in the lengthwise direction of said collar in a state of being inclined at a predetermined angle with respect to the lengthwise direction of said collar.

13. The vehicular floor construction according to claim 9, wherein said floor panel is a floor panel for a platform of a truck.

14. The vehicular floor construction according to claim 9, wherein said floor panel is a floor panel for a battery tray of an electric vehicle or a hybrid vehicle.

* * * * *